United States Patent [19]

Bhatia

[11] Patent Number: 5,677,415
[45] Date of Patent: Oct. 14, 1997

[54] APPARATUS AND PROCESS FOR A POLYCONDENSATION REACTION

[75] Inventor: Kamlesh Kumar Bhatia, Newark, Del.

[73] Assignee: E. I. Du Pont de Nemours and Company, Wilmington, Del.

[21] Appl. No.: 625,571

[22] Filed: Mar. 28, 1996

[51] Int. Cl.$^6$ .................................................. C08G 63/00
[52] U.S. Cl. ................. 528/176; 528/190; 528/193; 528/194
[58] Field of Search ......................... 528/176, 190, 528/193, 194; 526/62, 67, 71

[56] References Cited

U.S. PATENT DOCUMENTS

| | | | |
|---|---|---|---|
| 2,578,660 | 12/1951 | Auspos et al. | 260/75 |
| 2,647,885 | 8/1953 | Billica | 260/75 |
| 2,789,972 | 4/1957 | Reynolds et al. | 260/77.5 |
| 2,973,341 | 2/1961 | Hippe et al. | 260/75 |
| 3,110,547 | 11/1963 | Emmert | 18/54 |
| 3,248,180 | 4/1966 | Kilpatrick | 23/285 |
| 3,390,135 | 6/1968 | Seiner | 260/75 |
| 3,469,618 | 9/1969 | Siclari et al. | 159/48 |
| 3,480,587 | 11/1969 | Porter | 260/47 |
| 3,532,151 | 10/1970 | Hachiya et al. | 159/11 |
| 3,545,520 | 12/1970 | Siclari et al. | 159/4 |
| 3,594,356 | 7/1971 | Hinton | 260/88.2 |
| 3,619,145 | 11/1971 | Crawford | 23/285 |
| 3,819,585 | 6/1974 | Funk et al. | 528/305 |
| 4,100,142 | 7/1978 | Schaefer et al. | 526/68 |
| 4,212,963 | 7/1980 | Lehr et al. | 528/272 |
| 4,612,363 | 9/1986 | Sasaki et al. | 528/274 |
| 4,647,650 | 3/1987 | Sasaki et al. | 528/274 |
| 4,835,293 | 5/1989 | Bhatia | 549/274 |
| 5,064,935 | 11/1991 | Jackson et al. | 528/272 |

FOREIGN PATENT DOCUMENTS

| | | |
|---|---|---|
| 0 182 351 | 5/1986 | European Pat. Off. |
| 2 008 068 | 1/1970 | France |
| 2 389 649 | 12/1978 | France |

OTHER PUBLICATIONS

Ravindranath, K. et al, "Recent Advances in PET Manufacture", *Development in Plastic Technology–2*, Elsevier, UK, Chapter 1, pp. 33 & 34 (1985).

Primary Examiner—Terressa Mosley

[57] ABSTRACT

An improved process and apparatus for the production of polyester or other polycondesation polymers is disclosed. In particular, polymerization is conducted in a reaction vessel equipped with a specially designed agitator that exposes the polymer melt partially filling the reaction vessel to inert gas flowing through the vessel. The agitator comprises a plurality of elements that lift a portion of a polymer melt in the reaction vessel and generate films of the polymer melt which films extends in planes that are substantially parallel to the axis of the agitator and the flow of gas through the reaction vessel. In a preferred process, a melt of dihydroxy ethyl terephthalate, or its low molecular oligomers, obtained by esterifying terephthalic acid or transesterifying dimethyl terephthalate with ethylene glycol, is intimately contacted with an inert gas at about atmospheric pressure in order to remove the reaction by-products and facilitate polymerization.

28 Claims, 4 Drawing Sheets

APPARATUS AND PROCESS FOR A POLYCONDENSATION REACTION

FIELD OF THE INVENTION

An improved process and apparatus for the production of polyester or other polycondesation polymers is disclosed. In particular, polymerization is conducted in a reaction vessel equipped with a specially designed agitator that exposes the polymer melt within the reaction vessel to inert gas flowing through the vessel. The agitator comprises a plurality of elements that lift a portion of the polymer melt in the reaction vessel and generate films of the polymer melt which films extend in planes that are substantially parallel to central axis of the agitator and the flow of gas through the reaction vessel.

TECHNICAL BACKGROUND

Polyester production from terephthalic acid (TPA) or its esters, such as dimethyl terephthalate (DMT), and glycols is known. This has been accomplished by stage-wise melt polymerization of the dihydroxy ester of the bifunctional carboxylic acid, or low molecular weight oligomers thereof, under successively higher vacuum conditions. In order for the polymerization to continue to the degree needed for most commercial applications, the condensation by-products, especially ethylene glycol, must be removed from the reaction system at vacuums as high as 1–3 mm Hg. Such processes require costly high vacuum equipment, multistage steam jets to create the vacuum, and $N_2$ purged seals and flanges to minimize leakage of air into the system. Condensate from the steam jets and organic by-products from the system end up as a waste water stream that requires treatment and contributes to volatile organic emissions to the air. The present invention relates to a less costly polymerization process that can be carried out at atmospheric pressure.

Atmospheric pressure processes employing an inert gas have have been disclosed in the prior art, but these suffer from one or more drawbacks such as (1) the quantity of inert gas used is too large to be economical; (2) the reactor size might not be feasible for commercial-scale operation; (3) inert-gas velocities may be too high to be feasible for commercial-scale production, or (4) contact between the inert gas and the polymer melt in the reactor be inadequate or non-uniform. Because of such drawbacks, the processes and apparatus presently employed for commercial production of polyester continue to be conducted under high vacuum. One object of the present invention is to provide further improvement in a process, at about atmospheric pressure, for continuous or batchwise production of polyesters, particularly polyethylene terephthalate, of high molecular weight. In another aspect of the present invention, an improved apparatus that may be employed in a reaction process involving mass transfer of a volatile by-product into an inert gas, is disclosed.

SUMMARY OF THE INVENTION

The present invention is directed to a process for conducting condensation polymerization in a molten state in which an inert gas is employed to assist in removing a volatile condensation by-product. The process further comprises employing a substantially horizontally disposed cylindrical reactor vessel partly filled with a polymerization reaction mass in the form of a melt, which reactor vessel is equipped with the following:

a) a reactor inlet for introducing a polymerizable feed into the reactor vessel;

b) a gas inlet for introducing an inert gas at or near one end of the reactor vessel and a gas outlet for removing the inert gas at or near an opposite end of the reactor vessel, thereby resulting in gas flow past the reaction mass in the reactor vessel;

c) means for maintaining the reaction mass in the molten state; and d) an agitator that substantially spans the length of the vessel and that rotates on its axis during operation, said agitator comprising a plurality of elements that are longitudinally disposed to convey a portion of the melt as said elements move through the reaction mass and shed the melt as said elements move out of the melt, the elements being positioned such that said elements generate films, the planes of the films being substantially parallel to the central axis of the agitator and the flow of inert gas which is predominantly in the axial direction; and e) a reactor outlet for removing product polymer from the reactor vessel.

The agitator according to the present invention is different from agitators used in conventional vacuum processes, which agitators consist essentially of rotating disks or screens. Such prior art agitators generate films that are perpendicular to the axis of the reaction vessel.

In a preferred embodiment of the present process, polymerization is conducted at atmospheric pressure. A dihydroxy ester of a bifunctional carboxylic acid, or of a low molecular weight polymerizable oligomer thereof, is polymerized to a product with a high degree of polymerization (DP), preferably in the presence of a polyester polymerization catalyst, wherein by-products of the polymerization are removed from the system by means of an inert gas. This higher degree of polymerization is useful in fibers and films. This process provides an improved method for producing linear aromatic polyesters, especially polyethylene terephthalate (PET), also referred to as polyethylene glycol terephthalate. The bifunctional acid in the production of PET is terephthalic acid (TPA). The process involves the production of polyethylene terephthalate from terephthalic acid and ethylene glycol (EG) by esterification, or from dimethyl terephthalate (DMT) and ethylene glycol by a transesterification stage, followed by polycondensation. The process is conducted at atmospheric pressure or above, thereby avoiding high vacuum equipment and eliminating possible air contamination that causes product decomposition and gel formation. The process comprises esterifying terephthalic acid or transesterifying dimethyl terephthalate with ethylene glycol to produce dihydroxy ethyl terephthalate or its low molecular oligomers, and intimately contacting the dihydroxy ethyl terephthalate or its low molecular weight oligomers in melt form with an inert gas. The volatile reaction by-products are removed with the inert gas, so that the polymerization is complete in less than about 5 hours, preferably less than 3 hours, of contact time while the reactants are kept at a suitable temperature to maintain them in the melt form so as to produce polyethylene terephthalate.

The above processes are preferably conducted in the presence of a polyester polymerization catalyst. However, a catalyst is not needed for the esterification step if the starting material is terephthalic acid. In a preferred embodiment of the invention, a single stream of inert gas is recycled through a polymer finishing stage, a polycondensation stage and a stage wherein ethylene glycol is recovered for reuse in the process.

The invention is also directed to a novel apparatus for carrying out polycondensation or other reaction in which a volatile by-product is removed by mass transfer from a melt to an inert-gas stream.

Figure 1:
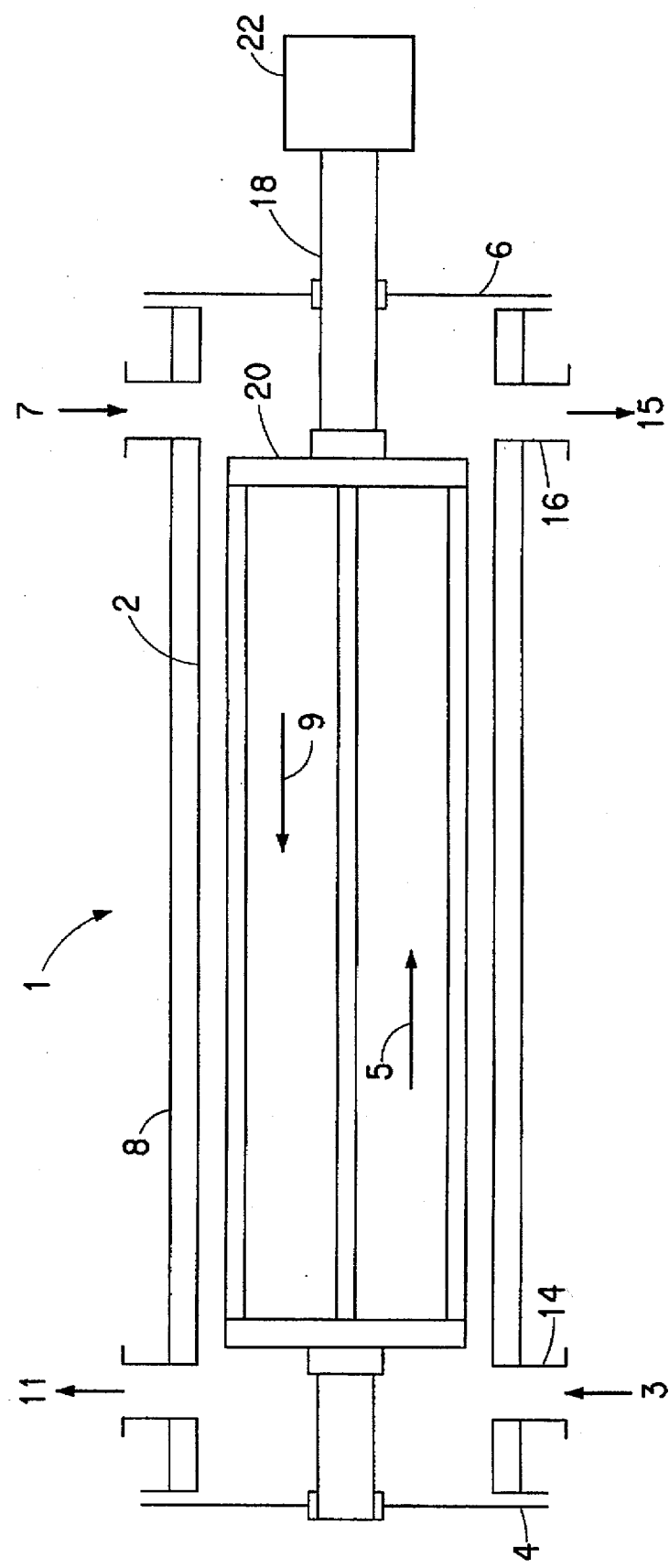
FIG. 1 represents a schematic drawing of one embodiment of an apparatus that is suitable for carrying out the polymerization of the invention, wherein material having a lower degree of polymerization is converted to material having a high degree of polymerization.

These figures are for the purpose of schematic illustration and are not drawn to scale.

DETAILED DESCRIPTION OF THE INVENTION

Polymerization according to the present process can be carried out in one vessel or more than one physically distinct vessel in series, wherein the reaction mass is polycondensed to some degree of polymerization in one vessel and then transferred to another vessel for further polymerization. The number of vessels may depend on mechanical considerations related to handling of the polymeric melt as its viscosity increases with the degree of polymerization, heat input requirements to volatilize the by-products of the reaction, and cost. Preferably, a single vessel may be employed to covert a prepolymer to a final product having the desired degree of polymerization (DP).

The process of the present invention may be carried out batchwise or continuously. Batchwise production may be preferred for preparing specialty polymers when the production required is not very large and strict quality control is required particularly with respect to additives. For large scale production for commodity applications, such as staple and yarn, it is more cost effective to carry out the above steps continuously wherein the reactants are fed substantially continuously into the processing vessels and the products are removed substantially continuously. The rates of feed and product removal are coordinated to maintain a substantially steady quantity of the reactants in the reaction vessels while the inert gas flows countercurrently to the flow of the melt.

If two or more vessels are employed in series for conducting the polycondensation, it is preferred that a single stream of inert gas is employed that flows countercurrently to the flow of the melt in the process, i.e., the inert gas leaving a final stage of polymerization is led through the preceeding stage and finally through a stage wherein the ethylene glycol is recovered for reuse and the inert gas is recycled back to the final stage of polymerization.

Polyethylene terephthalate (PET) is manufactured in this process by first reacting terephthalic acid (TPA) or dimethyl terephthalate (DMT) with ethylene glycol (EG). If DMT is the starting material, a suitable transesterification catalyst such as zinc or manganese acetate is used for the reaction.

In a preferred process, esterified DMT/TPA is polymerized as a melt at atmospheric pressure or above by intimately contacting the melt with a stream of inert gas (for example, but not limited to, $N_2$ or $CO_2$) to remove the condensation by-products, mainly, ethylene glycol. Preferably, the inert gas is preheated to about polymerization temperature or above, prior to its introduction into the polymerization equipment. It is preferred that the inert gas velocity through the polymerization equipment be in the range of 0.2 to 3 ft/sec, most preferably 0.3 to 1.5 ft/sec. The vapor leaving the polymerization (containing the ethylene glycol removed) is treated to recover the ethylene glycol for recycle to the esterification stage or for other uses. The inert gas stream is then cleaned up and recycled. Thus, the overall process operates as a closed loop system which avoids environmental pollution and integrates ethylene glycol purification and its recycle into the process.

The quantity of inert gas flow should be sufficient to carry the ethylene glycol to be removed at a partial pressure of ethylene glycol below the equilibrium partial pressure of ethylene glycol with the reaction mass at the operating temperature. The operating temperature during polycondensation is maintained sufficiently high so as to keep the reaction mass in a molten state. Preferably the temperature range is about 270° C. to 300° C. The polymerization equipment is designed so that the interfacial area between the melt and the inert gas is at least 20 square feet, preferably at least about 30 square feet, per cubic foot of the melt and that this surface area is renewed frequently. Under these process conditions, the high degree of polymerization useful for fibers and films can be achieved in less than 5 hours of residence time, and preferably in less than 3 hours of residence time.

To produce good quality product of the desired high degree of polymerization, the polymerization should be completed in a reasonably short period such as less than 5 hours, preferably less than about 3 hours. The polymerization is considered completed when the degree of polymerization (DP) desired for a particular application is achieved. For most common applications, such as fibers, the DP should be at least 50, preferebly at least 60, and most preferably at least 70. By "degree of polymerization" is meant the number average degree of polymerization. Exposure of the polymeric melt to high operating temperatures for prolonged period causes chain cleavage and decomposition reactions with the result that the product is discolored and a high degree of polymerization is not achieved. If the inert gas velocities are too low, polymerization takes longer. If the velocity is too high it can lead to entrainment of the reaction mass in the gas. In a continuous mode of operating, high inert gas velocities in a countercurrent direction can also hinder the flow of the melt through the equipment. Also, higher velocities may require larger quantities of gas flow without substantially increasing the effectiveness of polymerization.

The quantity of inert gas flow employed to remove the ethylene glycol that evolves is sufficiently high so that the partial pressure of ethylene glycol in the gas, at any point in the process, is well below the equilibrium partial pressure of ethylene glycol with the melt at this point. Larger quantities of gas flow generally increase the rate of polymerization but the increase is not proportionately greater. Therefore, very large mounts of gas are not usually necessary or desirable as large quantities increase the size of recycling equipment and the cost. Very large quantities may also require larger size polymerization equipment in order to keep the gas velocity in the desired range.

In the continuous embodiment of this invention, wherein the inert gas flows countercurrently to the flow of the molten reaction mass, effective polymerization rates can be achieved with about 0.3–0.7 pounds of $N_2$ per pound of the melt (equivalent to about 2 to 5 moles of inert gas per mole of the polymer repeat unit) as long as the inert gas velocity is at least about 0.2 ft/sec, preferably at least about 0.3 ft/sec. The $N_2$ flow, however, should be at least 0.2 lbs/lb of polymer (equivalent to 1.5 moles of inert gas per mole of polymer repeat unit). Larger quantities of gas flow may however be needed to obtain the preferred gas velocities.

In the process of this invention, the reactant is kept in a molten state, i.e., above its melting point which is about 260°–265° C. At temperatures much above 300° C., decomposition reactions cause product discoloration which interferes with the quality of the product. The reaction mass should preferably be maintained at about 270° C. to about 300° C.

For the polycondensation to continue, ethylene glycol generated must be removed from the reaction mass by the inert gas. This removal is facilitated if there is a high interfacial area between the melt and the gas phase. To complete the polymerization in a reasonably short period, the surface area should be at least about 20 $ft^2/ft^3$ of the melt, preferably at least about 30 $ft^2/ft^3$ of the melt. A higher surface area is preferred to increase the rate of polymerization. The reaction equipment for contacting the melt and the inert gas should also be designed to frequently renew the interfacial area and mix the polymer melt. This is particularly important as the degree of polymerization increases and the melt becomes very viscous.

The rate of polymerization can be increased by using a suitable polymerization catalyst, particularly where a high interfacial area is provided for inert gas—melt contact. The increase in the overall rate, however, is not proportional to the concentration of catalyst as the removal of ethylene glycol starts to limit the overall polymerization.

The catalyst also increases the rates of decomposition reactions. An effective concentration of catalyst for a set of reaction conditions, such as temperature, gas flow, velocity and surface area, is such that it gives the most enhancement in the rate of polymerization without substantial decomposition. The optimum concentration of catalysts of various species can be determined by experimentation. It would generally be in the range of a few parts per million parts of the polymer, such as about 5–300 parts per million.

Catalysts for facilitating the polymerization are any one or more polyester polymerization catalysts known in the prior art to catalyze such polymerization processes, such as, but not limited to, compounds of antimony, germanium and titanium. Antimony trioxide ($Sb_2O_3$) is an especially effective catalyst which may be introduced, for convenience, as a glycolate solution in ethylene glycol. Examples of such catalysts are found in U.S. Pat. No. 2,578,660, U.S. Pat. No. 2,647,885 and U.S. Pat. No. 2,789,772, which are incorporated herein by reference.

Dihydroxy esters of various bifunctional carboxylic acids may also be used in the processes described herein. These are monomeric compounds that can polymerize to a polymer. Examples of such compounds are bis(2-hydroxyethyl) terephthalate, bis(3-hydroxypropyl)terephthalate, bis(4-hydroxybutyl) terephthalate, bis(2-hydroxyethyl) naphthalenedioate, bis(2-hydroxyethyl) isophthalate, bis[2-(2-hydroxyethoxy)ethyl]terephthalate, bis[2-(2-hydroxyethoxy)ethyl]isophthalate, bis[(4-hydroxymethylcyclohexyl)methyl]terephthalate, bis[(4-hydroxymethylcyclohexyl)methyl]isophthalate, and a combination of bis(4-hydroxybutyl) terephthalate and their oligomers. Mixtures of these monomers and oligomers may also be used to produce copolymers.

By a "polymerizable oligomer" is meant any oligomeric material which can polymerize to a polyester. This oligomer may contain low molecular weight polyester, and varying amounts of monomer. For example, the reaction of dimethyl terephthalate or terephthalic acid with ethylene glycol, when carried out to remove methyl ester or carboxylic groups usually yields a mixture of bis(2-hydroxyethyl) terephthalate, low molecular weight polymers (oligomers) of bis(2-hydroxyethyl) terephthalate and oligomers of mono (2-hydroxyethyl) terephthalate (which contains carbonyl groups). This type of material is referred to herein as "polymerizable oligomer".

The process may also be used to produce various polyesters such as poly(ethylene terephthalate), poly(propylene terephthalate), poly(1,4-butylene terephthalate), poly(ethylene naphthalenedioate), poly(ethylene isophthalate), poly(3-oxa-1,5-pentadiyl terephthalate), poly(3-oxa-1,5-pentadiyl isophthalate), poly[1,4-bis(oxymethyl)cyclohexyl terephthalate] and poly[1,4-bis(oxymethyl)cyclohexyl isophthalate]. Poly(ethylene terephthalate) is an especially important commercial product.

The process avoids high vacuum polymerization processes characteristic of the conventional art. Advantages of the process are a simpler flow pattern, lower operating costs and the avoidance of steam jets, hot wells and atmosphere emissions. The process also has environmental advantages due to the elimination of volatile organic emissions and waste water discharge. Furthermore, polymerization is conducted in an inert environment. Therefore, there is less decomposition and gel formation which results in better product quality. Ethylene glycol and inert gas (e.g., $N_2$ or $CO_2$) are recycled continuously.

In a preferred embodiment of the process, an oligomer exiting the esterifier is prepolymerized to a degree of polymerization (DP) of about 15–30 and this prepolymer is fed to a finisher in order to polymerize it further to a higher DP of between about 50 and 150, preferably about 60 to about 120 and more preferably about 70 to about 90. The finisher is maintained at a temperature greater than about 260° C. but not too high to cause polymer decomposition. A temperature range of about 270° C. to 300° C. is preferred. The polymerization product is continuously removed from the finisher. An inert gas, preferably nitrogen, is heated in a heater to a temperature of from about 280° C. to 320° C. and is introduced into the finisher to flow countercurrent to the direction of polymer flow in order to remove volatile reaction by-products, primarily ethylene glycol. Preferably, the nitrogen is employed in a closed loop and all processing equipment for cleaning and recycling the nitrogen is operated at atmospheric pressure (or above, as is necessary to ensure the flow of nitrogen through the equipment in the loop). The quantity of inert gas introduced into the system is sufficient so that the partial pressure of the by-products is maintained below the equilibrium pressure of the by-products with the melt in order to provide for the continuous polymerization. The quantity of inert gas may be as small as about 0.3–0.7 pounds for each pound of polyethylene terephalate produced.

FIG. 1 illustrates one embodiment of a reactor or finisher that is suitable for carrying out the polymerization of the invention, especially for producing high viscosity polymers having a degree of polymerization encountered in a finisher.

The reactor comprises a horizontal, agitated cylindrical reaction vessel 1. The reactor housing 2 is conveniently constructed with a cylindrical body (shell) and end plates 4 and 6 that close off the ends of the cylindrical body. A reactor jacket 8 through which a heat transfer material is passed surrounds the cylindrical body. An exemplary heat-transfer material is Dowtherm® vapor, commercially available from Dow Chemical (Michigan). A reactor inlet 14 for introducing a prepolymer feed into the reactor is shown at one end of the reactor, a reactor outlet 16 for discharging product from the reactor vessel is shown at the opposite end of the reactor.

The esterified DMT or TPA, or low molecular weight oligomers or prepolymers thereof, is continuously introduced as stream 3 at one end of the reaction vessel. A preheated inert gas, such as nitrogen, is continuously introduced as stream 7 at the other end, so as to provide flow countercurrent to the polymer flow. The nitrogen stream 9 carrying reaction by-product vapors, mostly ethylene glycol, leaves the reaction vessel as stream 11. The reaction mass flows as the polymer melt stream 5. The polymerized product, polyethylene terephthalate, is removed as stream 15. The flow rates of streams 3 and 15 are coordinated to be equivalent to each other and controlled so as to provide the desired hold up of the melt in the finisher, usually about 1 to 3 hours, which is equivalent to a melt level at about ¼ to ⅓ of the diameter of the vessel. The quantity of nitrogen introduced into the system is sufficient so that the partial pressure of the evolving reaction by-products is maintained at less than the equilibrium pressure of the by-products in the, for example, poly(ethylene) terephthalate (PET) melt, so as to provide adequate driving force to remove ethylene glycol from the melt into the gas stream. The diameter of the vessel is designed so that the superficial velocity of the inert gas stream is in the desired range.

In one embodiment of the process, use of Dowtherm® heat transfer fluid or other heating means is eliminated by employing the preheated nitrogen stream itself for heating. In this embodiment the nitrogen stream is first led through the heating jacket 8 in FIG. 1 to maintain the reactor wall above the melting point of the reaction mass, and is then fed as stream 7 to the reaction vessel.

The reaction vessel in FIG. 1 is equipped with an agitator 20 attached via drive shaft 18 to a drive 22 so that the agitator can be rotated at a controlled speed. The mechanical design of the agitator is such that (a) the walls of the vessel are wiped;
(b) a large interfacial area of at least 20 ft²/ft³ of the melt preferably greater then 30 ft²/ft³ of the melt is created;
(c) the surface area is renewed frequently; and
(d) good mixing is provided.

Although shown horizontally disposed, it is possible for the reactor vessel to be positioned at a grade to facilitate the flow of reaction melt.

Figure 2A:
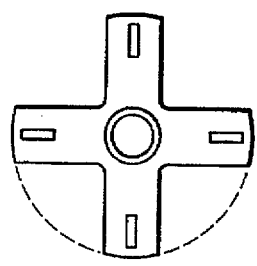
FIG. 2 represents a schematic drawing of one embodiment of a rotatable agitator frame.
Figure 2B:
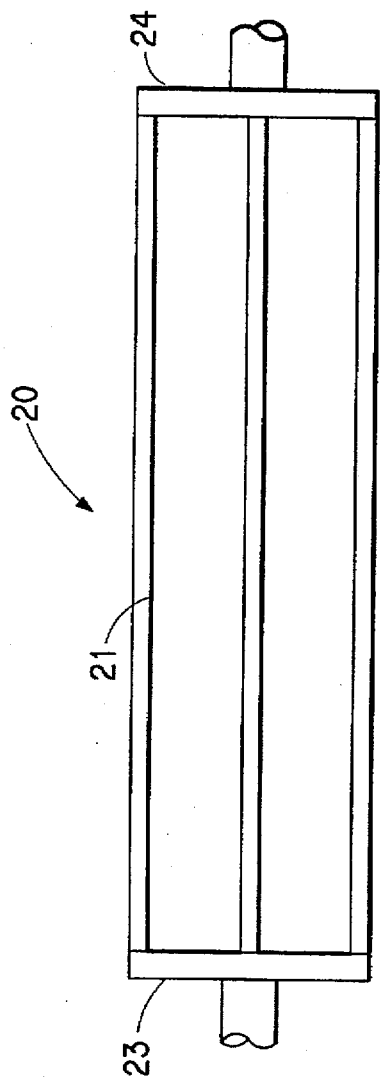

The agitator can have various designs, so long as they provide the desired surface area that is substantially parallel to the flow of inert gas during use, which is predominantly axial along the longitudinal central axis of the reaction vessel. In one embodiment, shown in FIG. 2, the agitator 20 comprises paddles 21 attached to rotatable ends 23 and 24 that rotate during use, to form a rotatable frame.

A central axle attached to the agitator in the reactor vessel may extend outside the housing of the reactor vessel where it is attached to a motor or drive for providing rotation of the agitator at a suitable rate.

The frame may comprise at least two sets of a pluraltity of arms that radially extent from the longitudinal axis of the reaction vessel. Each pair of arms can support a wiper, which is suitable as an elongated paddle. The edge of the paddle may be beveled to better wipe the internal surface of the reaction vessel. The wipers, or wiper blades, may be set at a suitable angle to move a suitable amount of melt as they move through the melt pool, so shedding of the melt for generating films can last through most of the rotation outside the pool. If the angle is such that the space between the wiper and the cylindrical wall is too narrow, the wipers will carry only a small amount of melt which may become quickly depleted by running through the clearance between the wipers and the cylindrical wall, and not enough left to generate films or be wiped on the inside cylindrical wall. If the angle is to large, on the other hand, more melt unnecessarily will be carried around.

The number of wiper blades and the number of arms attached to them at a point along the length of the reaction vessel may vary. Large diameter vessels would generally have more wipers. Also, there may be more wipers near the feed end, where the melt is less viscous, and less near the product end where the melt is very viscous. The wipers may, for example, be 2 to 32 in number, preferably 4 to 12 in number.

The wiper-frame assembly is of mechanically strong construction to withstand the torque required to move through the viscous polymer melt and carry it. In one embodiment, cross rods are attached between the wiper blades for mechanical reinforcement.

Figure 3A:
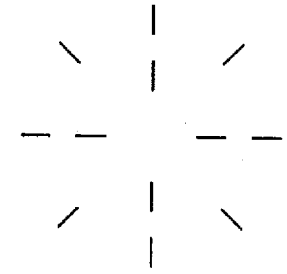
FIG. 3 illustrates a rotatable agitator frame comprising an additional inner concentric "cage" formed by another set of agitator elements.
Figure 3B:
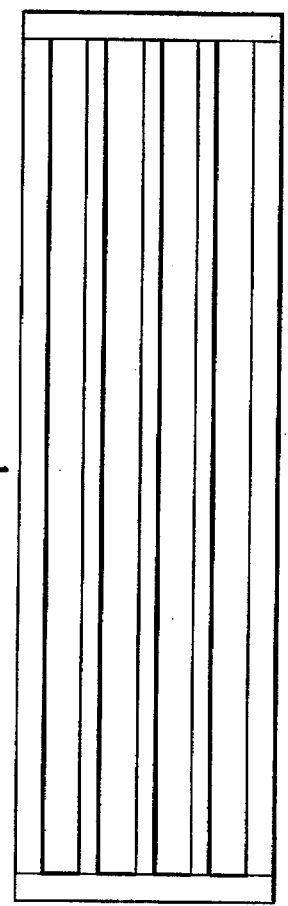
Figure 4B:
FIGS 4a, b, c, and d illustrate in isometric and cross-sectional views of an agitator employing rectangular screens as agitator elements for the generation of film surface.
Figure 4D:
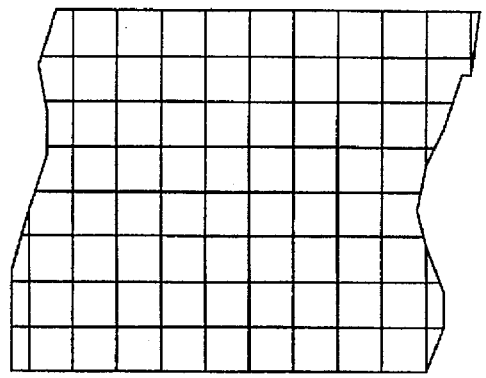
Figure 4A:
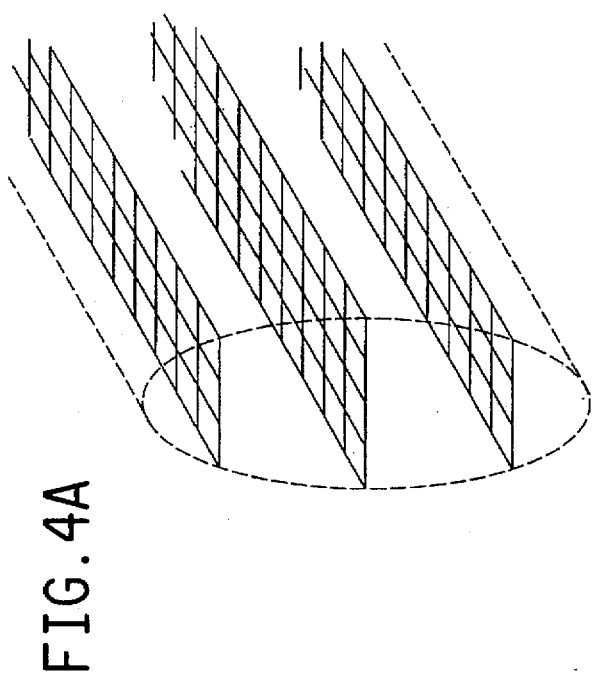
Figure 4C:
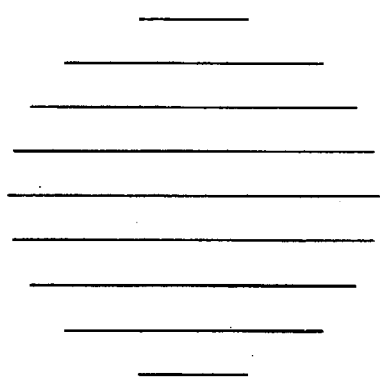

As the wipers or paddles move out of the pool of reaction mass, they shed the polymer melt as films that last for a short distance as the surface tension starts to gradually pull the melt film together into thicker streams that have much less surface area. It has been observed that the films last for about ½ inch when the DP is about 30–40, about 1 inch at about 50 DP and about 2 inch at 60–80 DP. Therefore, to maximize the surface area, additional longitudinal elements are placed under the wipers, at suitable distances, over which the melt can fall and continue to shed as films. It is advantageous to maintain the spacing between the elements narrow near the feed end where the melt is quite fluid and easily spreads into thin films, and to increase the spacing towards the product end where the melt is very viscous and flows as thick films. If the spacing is too narrow, the viscous melt would stagnate between the elements and not generate the desired surface area. Thus, the spacing may be as small as ½ inch near the feed end and 2–4 inch near the product end. Spacing can be optimized for a given diameter reaction vessel and speed of rotation. The longitudinal elements may be rectangular bars, rods, wires, meshed screen or sheets of metal punched out or cut to form grids of desired spacing. These may be arranged to form a "cage" or a plurality of concentric "cages" as shown in FIG. 3.

Alternatively, as shown in FIG. 4, the elements may be arranged in a rectangular geometry, these rectangles being substantially parallel to each other and extending longitudinally, again keeping the spacing larger at the viscous end and smaller at the less viscous end. The agitator may be thus built in sections that appear like a "stack" or a "sandwhich" of rectangular assemblies. These sections may be installed in the agitator frame staggered, e.g., the plane of one section may be perpendicular to those of the next section to as to keep the inert gas well distributed and to minimize by-passing (running through) of the melt by making the path more tortuous.

In FIG. 4, the elements are meshed screens, but these could be of other configurations such as rods or punched sheets of metal. In this type of agitator, the melt picked up by the wipers during their travel through the pool at the bottom, and thereafter shed by the wipers, flows along the rectangular elements to generate surface area.

The agitator is rotated at a rate (rpm) that maximizes the generation of surface area and provides frequent surface renewal. Faster surface renewal is advantageous for increasing the coefficient of transfer of volatile products from the reaction melt to inert gas but rotation that is too fast can result in the viscous polymer melt being held as "globs" between the elements and, in fact, decrease the surface renewal rate. For attaining a reasonably good transfer coefficient it is preferred that the surface be renewed at least once per minute. The agitator speed is also important to surface area generation. If the rotation is too slow, sufficient melt is not lifted from the pool, or is shed too early, and all the elements do not generate films. If the rotation is too fast the melt may be caught up as "globs" and does not flow effectively to generate surface area. The rate of transfer of the volatile by-products, and hence the rate at which the polymer DP increases is proportional to both the transfer coefficient (k) and the surface area (a). The rate of rotation, or revolutions per minute (rpm) for a given agitator geometry and vessel diameter may be optimized to maximize the product k×a. Preferably, the agitator is rotated at about 1 to 60 rpm, more preferably at about 1–30 rpm and most preferably at about 2–18 rpm.

Figure 5C:
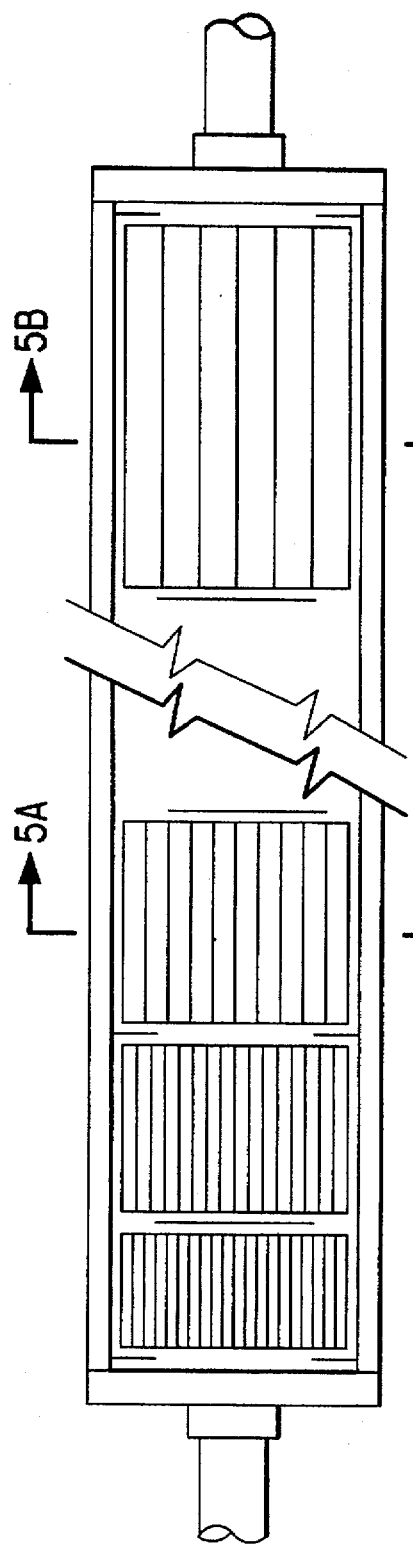
FIGS. 5a, b, and c illustrate side and cross-sectional views of an agitator assembly consisting of concentric cylindrical wire cages.
Figure 5B:
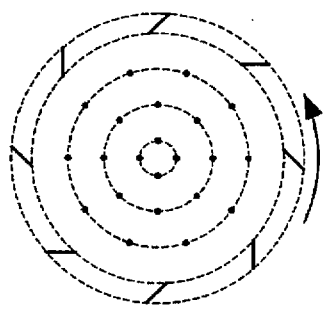
Figure 5A:
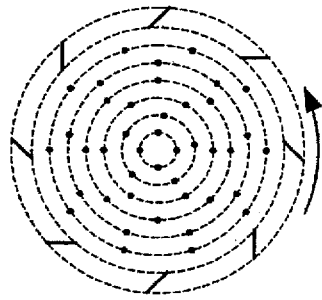

To illustrate a "cage" type construction in detail, one embodiment of an agitator is shown in FIG. 5 in which the elements are wires, the circumferential spacing of which varies along the length of the reactor vessel. The spacing is narrower at the feed end and wider at the discharge end. The agitator is divided into sections, and a plurality of concentric "cages" can exist in each section, the number of which may vary from section to section.

Surface area in this type of configuration is generated in two ways, first by filming of the melt circumferentially over the "cage" and, second, by drainage of the melt from the elements of one "cage" down to a smaller diameter "cage" below. The spacing and rpm are optimized so as to obtain good circumferential coverage and drainage at all points along the length of the agitator. The carrying of melt "globs" is minimized as discussed earlier. At the preferred 2–12 rpm, the spacing near the feed end may be as narrow as ½ inch and, near the product end, it may be 2–3 inches. Thus, it is preferable to have more concentric "cages" near the feed end and less at the discharge end. The surface area generated per unit length is, therefore, greater near the feed end and decreases along the length towards the product end as the number of "cages" decreases. To compensate for this, sections of larger spacing can be made proportionately longer. In this manner, the surface generated at each spacing, and hence the increase in DP at each spacing, is about the same.

The surface area created in the reactor equals the sum of (A) the wiped surface on the inside wall of the reactor, (B) the surface area of the melt pool, (C) the surface area of the agitator elements and those of the melt films generated as the agitator rotates. The area of the film is to be multiplied by 2 to account for the surface area available for mass transfer from both the sides of the films.

As the reactor size increases, contributions to the surface area from (A) and (B) decreases in relation to that from (C). Thus, for large, commercial scale finishers, most of the surface area is from the films generated by the agitator elements and the area due to (A) and (B) may be neglected for design purposes. For example, a 7 ft. diameter×29 ft. long reactor, designed to generate 15,000 square ft. of surface area, the contribution from (A) and (B) is less than 4%.

In calculating the surface area, that could be generated with an agitator assembly being considered, it is first assumed that an optimum combination of agitator RPM and element spacing is selected to maximize films generation, e.g., in the screens and wire "cage" type agitators, the screens and circumferential area of the "cages" are completely covered with melt. The film surface area is twice the covered area to account for the two sides of the films. Preferably, the reactor is designed for a higher area to compensate for less than complete coverage during operation under sub-optimal conditions.

The overall agitator for the reactor is conveniently built in sections or "spool pieces" that may be fastened together by suitable means. Fabricating the agitator in spool pieces offers the flexibility of providing different spacings or other variations depending on the particular application or conditions of use.

Such sectionalized fabrication of the agitator also allows the insertion of baffles, for example discs and donuts which contribute to the distribution of inert gas and improves contact between inert gas and the reaction mass. This also compartmentalizes the reactor longitudinally so that when it is operated continuously it acts like a number of reactors in series and the performance approaches that of a plug flow or a batch reactor.

The length and spacing of each Section can be conveniently determined by the following equations in which L is the total length of the agitator, N is the number of sections desired. The length of the first section (at the feed end) is given by the following equation:

$$L_1 = L / \left[ N + \frac{X-1}{N-1} \sum_{n=1}^{N} (n-1) \right]$$

where X=number of folds increase in the DP which is equal to DP of product/DP of the feed.

For subsequent sections, the nth section length is preferably defined as follows:

$$L_n = \frac{p_n}{p_1} \cdot L_1$$

wherein $p_n$ is the pitch or spacing of the wires in the nth section and $p_1$ is the spacing in the first section. The parameter $P_n$ is related to $p_1$ by the following equation.

$$\frac{p_n}{p_1} = 1 + \frac{(X-1)(n-1)}{N-1}$$

For concentric "cages" in a given section, the spacing between the consecutive cages equals the pitch.

The length of each section as calculated above may be rounded to a convenient figure for fabrication, such that:

$$L_1 + L_2 + L_3 \ldots L_N = L$$

The wires selected for this construction are of suitable gauge and have adequate mechanical strength to withstand the shear stresses of the viscous polymer melt. The wires may be 1/16" diameter near the feed end and of thicker gauge, for example, 3/16" diameter, near the viscous product end. Cross wires may be welded circumferentially at suitable distances, e.g., 3 to 5 times the pitch or wire spacing, for mechanical strength.

For ease of fabrication, a long rectangular wire mat of desired pitch and cross-wires distance may be first constructed and then rolled into a "spiral", instead of constructing individual "cages," while keeping the separation between consecutive winding of the spiral about the same as the distance between consecutive concentric "cages," i.e., about equal to the wire spacing.

Figure 6:
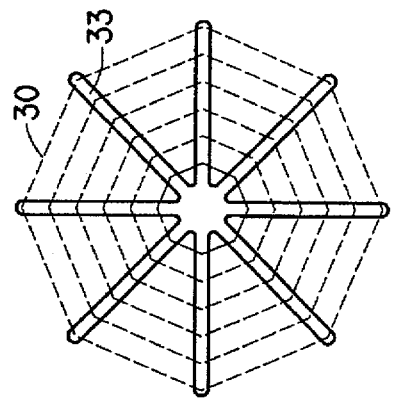
FIG. 6 illustrates concentric octagonal wire cages that can be employed in an agitator assembly.

The "cages" need not be necessarily cylindrical. For ease of fabrication, these may be of geometries such as hexagonal, octagonal, etc. FIG. 6 shows an octagonal assembly of wire cages as viewed from the end of the agitator. Rectangular sections of wire mats 30 are attached to the radial arms 33 of a rotatable end. Such geometries allow the wire mats to be cut or made in rectangular sections that can be welded to the radial arms.

The reaction vessel and the agitator is constructed from a suitable material of construction having the adequate mechanical strength at the operating temperature and which material, in order to produce a quality product, is not easily corroded or reactive with the reaction mass so as to contaminate the product. Stainless steel is one suitable material having the requisite properties.

The surface area needed to achieve a given degree of polymerization (DP) can be estimated, as a first approximation, by using the following simple equation which has been found to hold when polymerization is conducted under batch or plug flow conditions and a large quantity of inert gas is employed:

$$DP - DP° = kat$$

In this equation:
DP=the desired product DP
DP°=DP of the feed prepolymer or oligomer
a=surface area in square feet
t=residence time or hold up time in hours
k=overall transfer coefficient for transfer of the volatile condensation by-products, mostly ethylene glycol, from the melt to the insert gas. The units are ft/hr.

The transfer coefficient, k, depends upon several factors, such as temperature, surface renewal rate, catalyst concentration and inert gas velocity. Under the conditions of Example 1, its value was found to be about 0.79 ft/hr.

Thus, for polymerizing a prepolymer of 20 DP to a product of 80 DP in 2 hours of residence time, the surface area required, using this value for k, can be calculated as:

$$a = \frac{DP - DP°}{kt}$$
$$= \frac{80 - 20}{0.79 \times 2} = 38 \text{ ft}^2/\text{ft}^3 \text{ of melt}$$

For continuous polymerization, the reactor is preferably designed to provide a larger surface area, such as 50–75 ft$^2$/ft$^3$ of melt for the above example, to compensate for using less inert gas flow, e.g., 0.3–0.7 lbs $N_2$/lb of melt, and for deviations of the melt flow from the ideal plug flow. The higher than calculated surface area also permits operating flexibility. If the reactor has less area, the hold up time would need to be proportionately longer than 2 hours. The agitator configurations described herein can provide the required high surface areas.

For running the polymerization reaction continuously, it is desirable that the residence time distribution of the melt flow be narrow, i.e., it is closer to plug flow, and by-passing is prevented. By-passing can potentially occur around the straight paddles and agitator elements, particularly when the melt is not highly viscous.

The reactor may also be divided longitudinally into a number of compartments by introducing baffles such that melt flows from one compartment to the next and the reactor thus performs like several smaller reactors in series. One convenient way to achieve this is to insert along the length of the agitator rings or donuts with an outside diameter equal to that of the agitator. The inside diameter of the donuts is such that the reactor operates at the desired level. The inside diameter may be about 0.7 times the outside diameter. Disks may also be inserted in between the donuts to form a donut-disk-donut pattern, to keep the inert gas flow well distributed and improve contact with melt by forcing it to go through the donut and then around the disk, and so on. The baffles are sized such that the velocity of gas through, around or between them is not too high to cause entrainment or push melt in the direction of the inert gas flow.

Similarly, another embodiment of the agitator comprises partial disks or partial rings installed such that the inside edges are staggered at 180°, i.e., alternate baffles face in opposite directions, so that inert gas will zigzag as well as swirl, creating greater turbulence and more effective contact with the melt, as these are rotated.

The process of this invention may also be carried out for batchwise preparation of polyester wherein a batch of low molecular weight oligomer is charged to the polymerization equipment and contacted with the inert gas as described until the desired high degree of polymerization is achieved. The oligomer is prepared by esterification as described except that it may also be prepared batchwise either in a separate vessel or in the polymerization vessel itself. The gas and melt contacting equipment may be similar to that described for the continuous embodiment of this invention except that it is not necessary to vary the spacing between the agitator elements along the length of the vessel. Also, compartmentalization to approach plug flow is not required. The spacing of agitator elements should be chosen to accommodate the viscosity and flow characteristics of the final high molecular weight product. For batchwise preparation it is advantageous to adjust the speed of the agitator as the viscosity of the melt increases. Initially, when the viscosity is low, the agitator may operate at as high as 100 rpm but toward the completion of polymerization a low speed of about 1 to 20 rpm, preferably about 2–12 rpm is desirable. Batchwise production is suitable for economic reasons when relatively small quantities of polyester are to be prepared or when a strict control of additives concentrations is required for product quality considerations. When the quantities to be prepared are very small, it may be more economical to not provide equipment for recycling the inert gas, or the ethylene glycol, and discharge it to the atmosphere after rendering it harmless to the environment by known methods such as scrubbing it thoroughly with water and disposing off the water in an environmentally safe manner.

The invention can also be conducted in a semi-batch fashion wherein the polymerization equipment is fed intermittently, reaction mass is polymerized to a higher degree, and the product is discharged intermittently.

EXAMPLE 1

This examples illustrates polymerization on a pilot scale in a polymerization reactor according to the present invention. The reactor consisted of a nominal 6 inch diameter glass tube of 2 feet length. It was held inside an 8 inch diameter glass tube of similar length with the help of end plates so as to form an even annular space around the reactor and served as the heating jacket. The heating medium was air heated to 295°–300° C. which was introduced into the annular space at one end and flowed out from the other end.

The agitator consisted of two end pieces each with four arms in the shape of a cross. Each pair of arms held an approximately 20" long, 1" wide paddle or a wiper. Two rings were mounted inside this frame, each a few inches inside from the ends to hold four more such blades, such that the 8 blades formed a "cage" of slightly smaller diameter than the 6" diameter of the reactor so it could be freely rotated inside the reactor. Shafts were attached to the two cross end pieces which could be rotated inside bearings provided in the center of each end plate of the reactor. The agitator was rotated by use of a motor having a variable speed gear reducer attached to the shaft on one end of the reactor. The temperature of the polymer melt and the inert gas was monitored by placing thermocouples inserted into the reactor from each of its two ends.

The reactor was charged with 9 pounds of a prepolymer of about 20 DP obtained from a commercial plant where it was made by esterifying TPA with ethylene glycol and prepolymerizing it to a DP of about 20. It contained about 200 ppm antimony as catalyst. The charging was done by feeding the solid prepolymer through a melt extruder which melted the prepolymer and heated it to about 280°–295° C. The agitator was rotated at 12 rpm, and $N_2$ preheated to about 295° C. was flowed through the reactor at a velocity of 0.57 ft/sec based on an empty cross-section of the reactor. Since the reactor was about 30% filled with melt the contact velocity was about 0.82 ft/sec. The $N_2$ was introduced at one end and was discharged to the atmosphere from the other end. Thus, the reactor was essentially at atmospheric pressure. The temperature of the reaction mass was maintained at about 280° C. by controlling the temperature of the hot air in the annulus. Polymerization was continued under these conditions for two hours. Samples of the polymer were taken every half hour and analyzed for DP by gel permeation chromatography (GPC). The number average DP was found to be approximately 36, 52, 68, and 80, after ½, 1, 1½ and 2 hours of polymerization, respectively. These DP values when plotted against time fit a straight line:

$$DP-DP°=(ka)t$$

with a slope=$ka$ of 30 hr$^{-1}$.

The reactor was estimated to provide on the average 4.58 ft$^2$ of film area which for 9 lbs. of the melt translates to a value of "a" equal to 38 ft$^2$/ft$^3$ of melt. The value of k was thus $30/38=0.79$ ft/hr.

Initially, when the melt was at 20 DP, it was shed from the agitator blades as streamlets but after a few minutes it started becoming viscous and falling as films that extended about ¼–½" from the edges of the blades. As the polymerization proceeded to higher DP's the filming became more pronounced. The melt extended as films ¾–1" from the blades and towards the end the shed films extended 1–1½". Thus, larger surface area could have been generated if additional elements had been placed in the agitator, under the blades, over which the melt could fall and drop further as films. Also, instead of using hot air in the annular heating jacket, preheated $N_2$ could have been first passed through the annulus and then fed to the reactor.

EXAMPLE 2

This example illustrates a design of a prototype finisher according to the present invention to be operated continuously at a rate of 100 to 150 lbs/hr. It will be continuously fed with a prepolymer of 20 DP prepared in an upstream esterifier and a prepolymerizer. The reactor is designed to produce product PET of about 80 DP useful for spinning into fibers or producing flakes. The reactor is 9 ft long and has a diameter of 18 inches. It has a heating jacket heated with Dowtherm® vapor. It is fired with a 7.5 ft long agitator to leave about 9 inches of space on each end for feed and discharge nozzles. The agitator has end pieces or plates that each extend to 8 arms which are attached to the shafts for rotation. To each pair of arms is attached a 1½" wide wiper blade positioned at a 45° angle to the inside wall of the reactor. Held inside this eight wiper frame are spools of concentric "cages" of varying pithces fabricated from stainless steel wires such that, starting from the feed end, there is a 9 inch long section of ½" pitch (and spacing between the consecutive concentric "cages"), then 18" length of "cages" of 1" pitch, followed by 27" length "cages" that are at 1½" pitch and finally 36" length concentric cages of 2" pitch where the concentric "cages" are 2" apart. Donuts and disks are inserted alternatively between the spool pieces so the reactor is compartmentalized to act as 4 reactors in series. The agitator can be rotated at 3–12 rpm. Spools of each of the ½", 1", 1½" and 2" pitches can provide about 57 ft$^2$ of surface area for a total of 228 ft$^2$ of surface area. The reactor is operated with about 300 lbs or 4 ft$^3$ of melt hold up. This translates to an average surface area of 57 ft$^2$/ft$^3$ of the melt which is about 50% more than what would be required if it performed as an ideal plug flow reactor. $N_2$ is flowed countercurrently to the flow of the melt at 90 to 120 lbs/hr. The superficial gas velocity under the operating condition of about 1 atmosphere pressure and 285° C., based on an empty cross-section, is 0.36 to 0.48 ft/sec.

What is claimed is:

1. A process for manufacturing a polyester in a molten state in which an inert gas is employed to assist in removing a volatile condensation by-product, wherein the improvement comprises: employing a horizontally disposed cylindrical reactor vessel partly filled with a polymerization reaction mass in the form of a melt, which reactor vessel is equiped with the following:

a) a reactor inlet for introducing a polymerizable feed into the reactor vessel;

b) a gas inlet for introducing an inert gas at or near one end of the reactor vessel and a gas outlet for removing the inert gas at or near an opposite end of the reactor vessel, thereby resulting in gas flow past the reaction mass in the reactor vessel;

c) means for maintaining the reaction mass in the molten state;

d) an agitator that rotates on its axis during operation, said agitator comprising a plurality of elements that are longitudinally disposed to convey a portion of the melt as said elements move through the reaction mass, the elements being positioned so that said elements generate films, the planes of the films being parallel to the central axis of the agitator and the flow of inert gas which is predominantly in the axial direction; and e) a reactor outlet for removing product polymer from the reactor vessel.

2. The process of claim 1 for the for the continuous production of high molecular weight PET of fibers and films grade or higher DP from terephthalic acid (TPA) or an ester thereof and ethylene glycol, the process conducted at atmospheric pressure or above comprising intimately contacting DHET or its low molecular weight oligomers, in melt form, with an inert gas, flowing in the process countercurrently to the flow of the reaction melt, so that the ethylene glycol and other reaction by-products are removed continuously and wherein the product PET is removed continuously while a hold up equal to less than about 5 hours of the product throughput rate is maintained as a reaction mass maintained in melt form.

3. The process of claim 1, wherein the process is conducted at atmospheric pressure.

4. The process of claim 1, wherein said surface area of the films is at least 30 square feet per cubic feet of melt.

5. The process of claim 1, wherein the agitator elements are selected from the group consisting of elongated rectangular strips, screens, rods, wires, cut-out sheets, or punched-out sheets.

6. The process of claim 1, wherein the agitator comprises wipers to wipe the internal walls of the reactor vessel.

7. The process of claim 1, wherein the agitator elements are spaced in a circular or polygonal geometry, in cross-section, at one or more radial distances from the axis of the agitator to form concentric cages.

8. The process of claim 1, wherein the condensation polymer is poly(ethylene terephthalate).

9. The process of claim 1, wherein the inert gas is selected from the group consisting of nitrogen, carbon dioxide, and combinations thereof.

10. The process of claim 1, wherein the agitator is rotated at 2 to 12 rpm.

11. The process of claim 1, further comprising baffles.

12. The process of claim 1 wherein the baffles comprise donuts and discs longitudinally spaced along the reactor vessel.

13. The process of claim 1 wherein the distance between the agitator elements is increased along the length from the feed end to the product end of the reactor.

14. A process for the continuous production of high molecular weight PET of fibers and films grade or higher DP from a terephthalic acid (TPA) or an ester thereof and ethylene glycol, the process conducted at atmospheric pressure or above comprising intimately contacting DHET or its low molecular weight oligomers, in melt form, with an inert gas, flowing in the process countercurrently to the flow of the reaction melt, so that the ethylene glycol and other volatile by-products are removed continuously and wherein the product PET is removed continuously while a hold up equal to less than about 5 hours of the product throughput rate is maintained as a reaction mass maintained in a molten state, which process farther comprises employing a horizontally disposed cylindrical reactor vessel partly filled with a polymerization reaction mass in the form of a melt, which reactor vessel is equiped with the following:

a) a reactor inlet for introducing a polymerizable feed into the reactor vessel;

b) a gas inlet for introducing an inert gas at or near one end of the reactor vessel and a gas outlet for removing the inert gas at or near an opposite end of the reactor vessel, thereby resulting in gas flow past the reaction mass in the reactor vessel;

c) means for maintaining the reaction mass in the molten state;

d) an agitator that rotates on its axis during operation, said agitator comprising a plurality of elements that are longitudinally disposed to convey a portion of the melt as said elements move through the reaction mass and to shed the melt as said elements move out of the melt, the elements being positioned so that said elements generate films, the planes of the films being substantially parallel to the central axis of the agitator, wherein the films that are thus generated provide most of the interfacial surface area in the reactor, and e) a reactor outlet for removing product polymer from the reactor vessel.

15. The process of claim 14 wherein the inert gas flows at a velocity of 0.2 to 3 ft/sec and the interfacial surface area is at least about 20 $ft^2/ft^3$ of the melt.

16. The process of claim 14 wherein the agitator elements are ½ to 1 inch apart near the feed end of the reactor, the spacing is increased stepwise along the length of the agitator and the elements are 1.5 to 4 inches apart near the product end of the reactor.

17. The process of claim 14 wherein the feed is an oligomer of dihydroxy ethyl terephthalate of at least about 5 DP and polymerization to the final product DP is conducted by contacting the reaction melt with the inert gas in a single reaction vessel.

18. The process of claim 14 wherein the inert gas is selected from $N_2$ and $CO_2$.

19. The processes of claim 14 wherein the flow rate of the inert gas is at least about 1.5 moles per mole of the PET repeat unit.

20. The process of claim 14 wherein the flow rate of inert gas is about 2 to 3 moles per mole of the polymer repeat unit.

21. The process of claim 14 wherein the polymerization is conducted in the presence of a suitable polyester polymerization catalyst to enhance the reaction rate.

22. The process of claim 21 wherein the catalyst is selected from group consisting of of antimony, germanium and titanium.

23. The process of claim 14 wherein the inert gas is preheated to about polymerization temperature or above polymerization temperature prior to contacting it with the melt.

24. The process of claim 1 wherein the polymerizable feed comprises a prepolymer of one or more dihydroxy esters of bifunctional carboxylic acids selected from the group consisting of bis(2-hydroxyethyl) terephthalate, bis (4-hydroxybutyl) terephthalate, bis(2-hydroxyethyl) naphthalenedioate, bis(2-hydroxyethyl) isophthalate, bis[2-(2-hydroxyethoxy)ethyl]terephthalate, bis[2-(2-hydroxyethoxy)ethyl]isophthalate, bis[(4-hydroxymethylcyclohexyl)methyl]terephthalate, and bis[(4-hydroxymethylcyclohexyl)methyl]isophthalate.

25. The process of claim 14 wherein the quantity of the inert gas introduced into the system is sufficient so that the partial pressure of the by-products is maintained at less than the equilibrium pressure of the by-products with the melt.

26. The process of claim 14 wherein the temperature of polymerization is about 270° C. to about 300° C.

27. An apparatus for the production of polyesters in a molten state, which apparatus comprises a substantially horizontally disposed cylindrical reactor equipped with the following:

a) a reactor inlet for introducing a polymerizable feed into the reactor vessel;

b) a gas inlet for introducing an inert gas at or near one end of the reactor vessel and a gas outlet for removing the inert gas at or near an opposite end of the reactor vessel, thereby resulting in gas flow past the reaction mass in the reactor vessel;

c) means for maintaining the reaction mass in the molten state;

d) an agitator that is adapted to rotate on its axis during operation, said agitator comprising a plurality of elements that are longitudinally disposed adapted to convey a portion of a melt at the bottom of the reactor as said elements move through the melt and to shed the melt as said elements move out of the melt, the elements being positioned so that said elements are adapted to generate films, the planes of the films being parallel to the longitudinal axis of the reactor vessel; wherein the fills that are thus generated provide most of the interfactial surface area in the reactor, and e) a reactor outlet for removing product polymer from the reactor vessel.

28. The apparatus of claim 27 wherein the agitator further comprises baffles along its length to improve inert gas distribution or reduce by-passing of the reaction mass in continuous operation or to both improve inert gas distribution and reduce by-passing of the reaction mass in continuous operation.

* * * * *